US008380842B2

(12) United States Patent
Bates et al.

(10) Patent No.: US 8,380,842 B2
(45) Date of Patent: Feb. 19, 2013

(54) SYSTEM AND METHODS FOR THE UNIVERSAL INTEGRATION OF PLANT FLOOR ASSETS AND A COMPUTERIZED MANAGEMENT SYSTEM

(75) Inventors: Alex Bates, San Diego, CA (US); Paul Rahilly, San Diego, CA (US); Scott MacNab, Wilsenville, OR (US); Gordon Brooks, San Diego, CA (US)

(73) Assignee: Mtelligence Corporation, San Diego, CA (US)

( * ) Notice: Subject to any disclaimer, the term of this patent is extended or adjusted under 35 U.S.C. 154(b) by 1638 days.

(21) Appl. No.: 11/740,404

(22) Filed: Apr. 26, 2007

(65) Prior Publication Data

US 2008/0271057 A1    Oct. 30, 2008

(51) Int. Cl.
*G06F 15/16* (2006.01)
*G06F 15/173* (2006.01)
*G08B 21/00* (2006.01)

(52) U.S. Cl. ......... 709/224; 709/217; 340/501; 340/679

(58) Field of Classification Search .................. 709/246, 709/217, 224; 340/501, 679
See application file for complete search history.

(56) References Cited

U.S. PATENT DOCUMENTS

| | | | |
|---|---|---|---|
| 5,764,155 A | 6/1998 | Kertesz et al. |
| 6,192,325 B1 | 2/2001 | Piety et al. |
| 6,266,713 B1 | 7/2001 | Karanam et al. |
| 6,411,963 B1 | 6/2002 | Seese et al. |
| 6,421,571 B1 | 7/2002 | Spriggs et al. |
| 6,466,934 B2 | 10/2002 | Seese et al. |
| 6,513,044 B2 | 1/2003 | Seese et al. |
| 6,587,900 B1 | 7/2003 | Wischinski |
| 6,600,964 B2 | 7/2003 | Hess et al. |
| 6,687,761 B1 | 2/2004 | Collins et al. |
| 6,775,576 B2 | 8/2004 | Spriggs et al. |
| 6,813,587 B2 | 11/2004 | McIntyre et al. |
| 6,889,096 B2 | 5/2005 | Spriggs et al. |
| 6,901,432 B2 | 5/2005 | Peterson et al. |
| 6,993,576 B1 | 1/2006 | Labedz et al. |
| 7,085,841 B2 | 8/2006 | Edwards et al. |
| 7,117,119 B2 | 10/2006 | Van Dyk et al. |
| 7,120,558 B2 | 10/2006 | McIntyre et al. |
| 7,133,727 B2 | 11/2006 | Van Dyk et al. |
| 7,146,230 B2 | 12/2006 | Glanzer et al. |

(Continued)

OTHER PUBLICATIONS

Mathew et al., A review of the MIMOSA OSA-EAI database for condition monitoring systems., Jul. 2006 http://eprints.qut.edu.au/8290/.*

(Continued)

*Primary Examiner* — Joseph Avellino
*Assistant Examiner* — James Conaway
(74) *Attorney, Agent, or Firm* — Cooley LLP

(57) ABSTRACT

A server platform and a method to integrate a plurality of diverse plant floor equipment with at least one computerized management system in a manufacturing operational or maintenance system. The server platform includes a plurality of plant floor drivers adapted to communicatively interface with a plurality of diverse plant floor data sources. The server platform further includes at least one computerized management system driver adapted to communicatively interface with the at least one computerized management system. The server platform also includes a message translator adapted to broker communication between the plant floor data sources and the at least one computerized management system using an open standard. The server platform, using the open standard, enables a universal enterprise type taxonomy across the plant floor data sources and the at least one computerized management system.

57 Claims, 10 Drawing Sheets

U.S. PATENT DOCUMENTS

| | | |
|---|---|---|
| 7,151,966 B1 | 12/2006 | Baier et al. |
| 7,181,493 B2 | 2/2007 | English et al. |
| 7,512,906 B1 * | 3/2009 | Baier et al. .................... 715/866 |
| 7,548,970 B2 | 6/2009 | Labedz et al. |
| 7,606,919 B2 | 10/2009 | Labedz et al. |
| 8,200,620 B2 * | 6/2012 | Akiyama et al. ............. 707/609 |
| 2001/0001851 A1 | 5/2001 | Piety et al. |
| 2001/0032202 A1 | 10/2001 | Seese et al. |
| 2001/0032206 A1 | 10/2001 | Seese et al. |
| 2002/0103828 A1 | 8/2002 | Kupiec et al. |
| 2002/0116486 A1 | 8/2002 | Toure et al. |
| 2002/0161674 A1 * | 10/2002 | Scheer ............................ 705/28 |
| 2002/0198990 A1 | 12/2002 | Bradfield et al. |
| 2003/0004598 A1 | 1/2003 | Morris |
| 2003/0004987 A1 | 1/2003 | Glanzer et al. |
| 2003/0023518 A1 * | 1/2003 | Spriggs et al. .................. 705/28 |
| 2003/0028269 A1 | 2/2003 | Spriggs et al. |
| 2003/0126222 A1 | 7/2003 | Peterson et al. |
| 2003/0200060 A1 | 10/2003 | Eryurek et al. |
| 2003/0200130 A1 | 10/2003 | Kall et al. |
| 2004/0024572 A1 | 2/2004 | Pagnano et al. |
| 2004/0143628 A1 | 7/2004 | Bradford et al. |
| 2004/0153594 A1 | 8/2004 | Rotvold et al. |
| 2005/0010931 A1 | 1/2005 | Langkafel et al. |
| 2005/0027379 A1 | 2/2005 | Dyk et al. |
| 2005/0044532 A1 | 2/2005 | Pfander et al. |
| 2005/0060408 A1 | 3/2005 | McIntyre et al. |
| 2005/0177533 A1 | 8/2005 | Herzog |
| 2005/0267882 A1 * | 12/2005 | Aupperlee et al. ................ 707/4 |
| 2006/0058987 A1 * | 3/2006 | Kumar et al. ..................... 703/2 |
| 2006/0074498 A1 | 4/2006 | Kalan et al. |
| 2006/0133412 A1 | 6/2006 | Callaghan |
| 2006/0164296 A1 | 7/2006 | LaMothe et al. |
| 2006/0224361 A1 | 10/2006 | McIntyre et al. |
| 2006/0235951 A1 | 10/2006 | Edwards et al. |
| 2006/0259603 A1 | 11/2006 | Shrader et al. |
| 2007/0143162 A1 * | 6/2007 | Keever et al. ..................... 705/7 |
| 2007/0226317 A1 * | 9/2007 | Rydberg et al. ............... 709/218 |
| 2008/0079560 A1 * | 4/2008 | Hall et al. ..................... 340/506 |
| 2010/0082130 A1 * | 4/2010 | Plache et al. ................... 700/83 |
| 2012/0078403 A1 * | 3/2012 | Cahill et al. ................... 700/95 |
| 2012/0173671 A1 * | 7/2012 | Callaghan et al. ............ 709/217 |

OTHER PUBLICATIONS

MIMOSA, MIMOSA's Open System Architecture for Enterprise Application Integration (OSA-EAI) Technical Architecture Summary, Dec. 2006.*

OpenO&M, Collaborative Operations & Maintenance Using MIMOSA's OSA-EAI and ISA-95/B2MML, Oct. 2006.*

MIMOSA; MIMOSA's Open System Architecture for Enterprise Application Integration (OSA-EAI) Technical Architecture Summary; May 2006.

MIMOSA; MIMOSA OSA-EAI, Common Conceptual Object Mode, Version 3.0; Updated: May 2, 2006.

Machinery Information Management Open Systems Alliance; Tech-XML-Services Client & Server, Version 3.0; Jun. 16, 2006.

* cited by examiner

SYSTEM AND METHODS FOR THE UNIVERSAL INTEGRATION OF PLANT FLOOR ASSETS AND A COMPUTERIZED MANAGEMENT SYSTEM

TECHNICAL FIELD

Certain embodiments of the present invention relate to manufacturing operational and maintenance systems and methods. More particularly, certain embodiments of the present invention relate to a server platform and method for integrating a plurality of diverse plant floor equipment to at least one computerized management (CM) system by enabling a universal enterprise type taxonomy across the plant floor data sources and the CM system using an open standard.

BACKGROUND

Large manufacturers today face extreme margin pressures from low-cost producers, rising energy costs, and regulatory and environmental restrictions. The need to improve asset performance is very great. One barrier to improvement has been the absence of a performance management solution encompassing the various divisions of operations, maintenance, and finance, for example. With each division using its own performance metrics, it is difficult for optimal decisions to be made, such as balancing reliability goals against asset utilization goals.

Many people have been chasing the "holy grail" of self-diagnostics. Furthermore, there are many balanced scorecards and key performance indicator solutions being offered in today's market. Many seem to be making similar claims including that their product will make a manufacturing process run better, faster, more efficiently, and with greater returns. However, one of the greatest challenges for effectively improving plant asset performance is that the necessary information is scattered across disconnected silos of data in each department. Furthermore, it is difficult to integrate these silos due to several fundamental differences. For example, control system data is real-time data measured in terms of seconds, whereas maintenance cycle data is generally measured in terms of calendar based maintenance (e.g., days, weeks, months, quarters, semi-annual, annual), and financial cycle data is measured in terms of fiscal periods. Furthermore, different vendors of various equipment and enterprise systems tend to have their own set of codes (e.g., status codes) and are non compliant with any universal standard.

An open standard is a standard that is publicly available and has various rights to use associated with the standard. The term "open" is sometimes restricted to royalty-free technologies while the term "standard" is sometimes restricted to technologies approved by formalized committees that are open to participation by interested parties and which operate on a consensus basis. As used herein, the term "open" refers to a standard that is publicly available and that may be used across vendors and customers.

MIMOSA (Machinery Information Management Open Systems Alliance) is an operations and maintenance information open systems alliance organized as a non-profit trade association which includes vendors, integrators and service providers, and end users. MIMOSA collaboratively develops and promotes open standards for operations and maintenance for fleets, plants, and facilities. MIMOSA produces vendor-neutral open information exchange standards. The MIMOSA open standard provides a common language for vendors to use. However, the MIMOSA standard assumes that every external vendor system is speaking the MIMOSA language, which is not the case today and is not likely to become the case any time soon.

Manufacturers are drowning in a flood of real-time and non-real time data and are losing revenues at the same time. Therefore, there is a growing call for a manufacturing intelligence solution that contextualizes the disparate data in a balanced manner.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY

An embodiment of the present invention comprises a server platform for integrating a plurality of diverse plant floor equipment with at least one computerized management (CM) system. The server platform includes a plurality of plant floor drivers adapted to operationally interface with a plurality of diverse plant floor data sources to at least receive information from the plant floor data sources. The server platform also includes at least one CM system driver adapted to operationally interface with the at least one CM system to at least receive information from the at least one CM system. The server platform further includes a message translator adapted to broker communication between the plant floor data sources and the at least one CM system using an open standard.

Another embodiment of the present invention comprises a method of integrating a plurality of diverse plant floor equipment with at least one computerized management (CM) system. The method includes establishing first communication links between a server platform and a plurality of diverse plant floor data sources via a plurality of plant floor adapters of the server platform to at least receive information from the plant floor data sources. The method further includes establishing a second communication link between the server platform and at least one computerized management (CM) system via at least one CM system adapter of the server platform to at least receive information from the CM system. The method also includes discovering defined device objects and types of the plurality of plant floor data sources via the first communication links and importing the discovered device objects and types into the server platform. The method further includes discovering defined management objects and types of the at least one CM system via the second communication link and importing the discovered management objects and types into the server platform. The method also includes mapping the discovered objects and types to universal identifiers within the server platform, wherein the universal identifiers are defined in an open standard.

A further embodiment of the present invention comprises a system for maintenance and asset management. The system includes a plurality of plant floor data sources adapted to collect data from a plurality of plant floor equipment. The system also includes at least one computerized management (CM) system and a server platform adapted to integrate the plurality of plant floor data sources with the at least one CM system based on a universal enterprise type taxonomy using an open standard.

These and other advantages and novel features of the present invention, as well as details of illustrated embodiments thereof, will be more fully understood from the following description and drawings.

DETAILED DESCRIPTION

Figure 1:
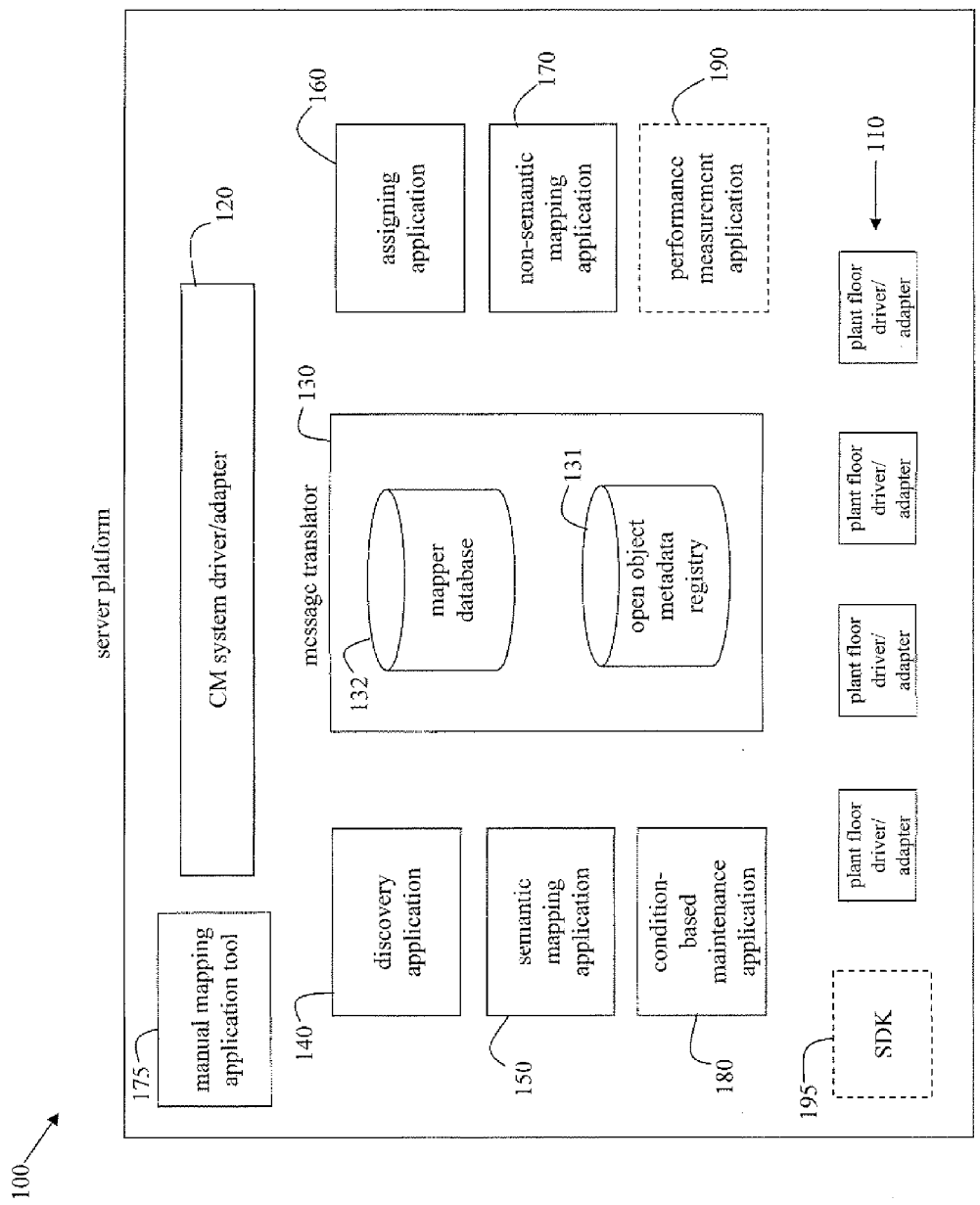
FIG. 1 is a schematic block diagram of an embodiment of a server platform for integrating a plurality of diverse plant floor equipment with at least one computerized management (CM) system.

FIG. 1 is a schematic block diagram of an embodiment of a server platform 100 for integrating a plurality of diverse plant floor equipment with at least one computerized management (CM) system for the purpose of maintenance and asset management in an enterprise. The server platform 100 interfaces between plant floor data sources 210 of the plant floor equipment 220 and a computerized management (CM) system 230 (see FIG. 2), enabling a universal enterprise type taxonomy across the plant floor data sources 210 and the CM system 230 in a manufacturing operational or maintenance environment, for example.

Figure 2:
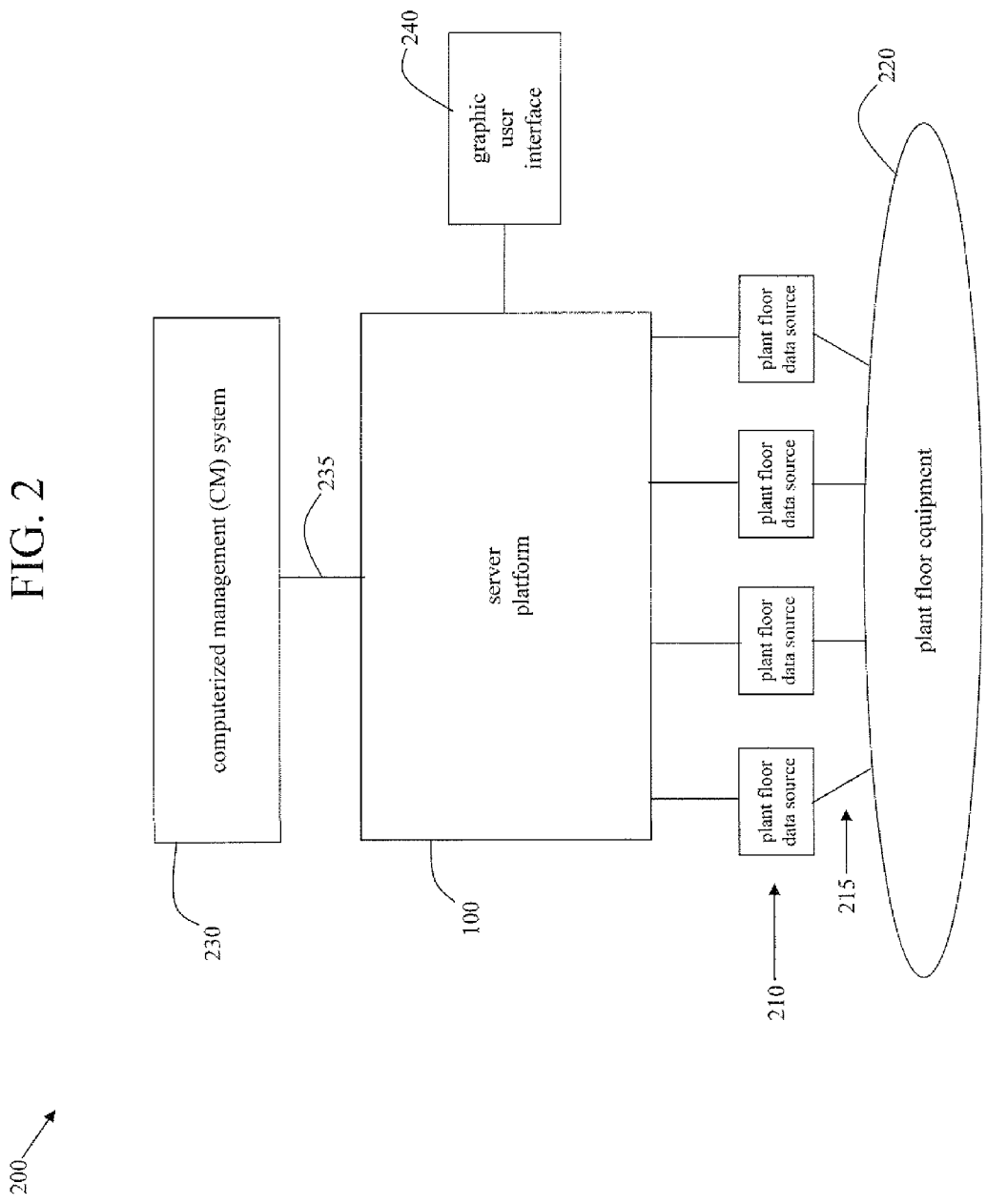
FIG. 2 is a schematic block diagram of an embodiment of a system for maintenance and asset management using the server platform of FIG. 1.

FIG. 2 is a schematic block diagram of an embodiment of a system 200 for maintenance and asset management using the server platform of FIG. 1. The server platform 100 provides an open standard interface between the plant floor and the CM system. In accordance with an embodiment of the present invention, the server platform provides a common MIMOSA-based interface between the plant floor and the CM system, allowing interoperability between the plant floor and the CM system. The server platform 100 provides the tools and applications to contextualize information and broker communication using the MIMOSA standard vocabulary. Information utilized by the MIMOSA message protocol is organized and communicated using XML, in accordance with an embodiment of the present invention.

The CM system 230 may comprise an enterprise asset management (EAM) system or a computerized maintenance management system (CMMS), for example. Other CM systems are possible as well. The CM system 230 typically acts as a maintenance system but may also encompass other areas such as costs and financials in which executives may have an interest. In accordance with an embodiment of the present invention, more than one CM system may be interfaced to the server platform 100, even if the CM systems are of differing kinds.

The plant floor equipment 220 may include, for example, motors, compressors, engines, boilers, manufacturing machines, or any other type of equipment that may be found in a plant or factory environment. The plant floor data sources 210 include devices that provide access to operational or measurement data of the plant floor equipment 220. For example, the plant floor data sources 210 may include on-line condition monitoring devices, process control devices, asset health devices, plant historian devices, transient measurement devices, off-line sampling measurement devices, human-machine interface devices (e.g., for inspection-based expert recommendations), or any other type of devices that collect and output electronic data or information related to the plant floor equipment 220.

The plant floor equipment 220 and the associated plant floor data sources 210 tend to be of very diverse and disparate types. Also, the CM systems tend to be quite unique in their design and data structures. The server platform 100 provides the integration that allows information collected from such disparate types to be related and effectively used to trigger work flows and generate work orders in the context of the manufacturing operational or maintenance environment. Typically, the server platform 100 is deployed at facility headquarters and connects down to the plant floor systems from there. However, if there is a large volume of equipment at a plant and/or a large geographical distance between the plant and headquarters over a wide area network, then a logical gateway may be installed at the plant acting as a buffer to be able to send data to the server platform 100 at facility headquarters.

Referring again to FIG. 1, the server platform 100 includes a plurality of plant floor drivers or adapters 110 which allow interfacing of the server platform 100 to the plant floor data sources 210 to transmit and receive information between the server platform 100 and the plant floor data sources 210. The plant floor drivers/adapters 110 comprise software and/or firmware type drivers/adapters, in accordance with certain embodiments of the present invention. The plant floor drivers 110 may support various open communication protocols and various proprietary communication protocols to allow access to various types of real-time data and non-real-time data associated with the plant floor equipment 220. Examples of some of the plant floor side communication protocols include OPC (an open connectivity protocol), modbus, and XML web services. Other communication protocols are possible as well.

In accordance with an embodiment of the present invention, the server platform 100 may be connected to a plant floor data source 210 by entering security credentials and then entering a network identifier and IP address of the data source to which to connect. After connection, the various information (objects and types) from the data source may be pulled into the server platform 100.

The server platform 100 also includes at least one CM system driver or adapter 120 which allows interfacing of the server platform 100 to at least one CM system 230 to transmit and receive information between the server platform 100 and the CM system 230. Again, the CM driver/adapter 120 comprises a software and/or firmware type driver/adapter, in accordance with certain embodiments of the present invention. The CM driver/adapter 120 supports a web services protocol, in accordance with certain embodiments of the present invention. For example, in accordance with an embodiment of the present invention, the CM driver/adapter 120 supports the MIMOSA OSA-EAI Tech-XML-services web services protocol.

At the heart of the server platform 100 is a message translator 130. The message translator 130 acts as a communication broker between the CM system 230 and the plant floor data sources 210 based on a universal type taxonomy. The message translator 130 allows contextualization of received information with metadata and allows mapping of specific vendor types to universal type identifiers. The message translator 130 also allows discrete mapping of specific vendor objects to universal object identifiers. As a result, information and data from both the plant floor side and the CM system side may be associated and related to each other in a meaningful manner such that appropriate work flows may be triggered and such that appropriate work orders may be generated and/or updated to facilitate maintenance and asset management of the enterprise. As used herein, the term vendor refers to the plant floor side and/or the CM system side of the enterprise. At run time, the message translator 130 translates back and forth between the plant floor side and the CM side from an object identifier standpoint and also from a semantic type standpoint.

The message translator 130 includes an open object metadata registry 131 which is a semantic database model. The open object metadata registry 131 includes pre-defined open standard universal identifiers and type taxonomies to which plant floor objects and types and CM system objects and types are associated upon set up or configuration of the server platform 100. The open object metadata registry 131 also includes various tables which are updated at run time to keep track of conditions such as, for example, status and priority. In accordance with an embodiment of the present invention, the open object metadata registry 131 is based on the MIMOSA standard and, therefore, uses MIMOSA-defined universal object and type identifiers.

The message translator 130 also includes a mapper database 132 which stores the various mappings that occur between plant floor objects and types and universal objects and types, as well as mappings that occur between CM system objects and types and universal objects and types. Again, the universal objects and types are defined by an open standard (e.g., the MIMOSA open standard) and are stored in the open object metadata registry 131. Types take on a semantic value.

As used herein, the terms vendor objects and types refer to the various information and data that may be collected by the server platform 100 from the plant floor data sources 210 (i.e., device objects and device types) and the CM system 230 (i.e., management objects and management types). The terms open standard objects and types refer to the various universal object and type identifiers or codes defined by the open standard (e.g., MIMOSA object identifiers and MIMOSA type identifiers). By relating the various device objects and types and the various management objects and types to the universal object and type identifiers, a universal enterprise taxonomy may be established across the plant floor data sources 210 and the CM system 230. By establishing such a universal enterprise taxonomy using such an open standard, a manufacturing intelligence solution that contextualizes the disparate data in a balanced manner is provided.

The mappings stored in the mapper database 132 may include semantic mappings and non-semantic mappings. For example, semantic mappings may include mappings between device types and universal type identifiers, and mappings between management types and universal type identifiers. Furthermore, for example, semantic mappings may include mappings between device objects and universal type identifiers, and mappings between management objects and universal type identifiers. When a vendor type or object is mapped to a universal type ID having a pre-defined semantic meaning, then the mapped vendor type or object has been contextualized.

Non-semantic mappings may include, for example, mappings between device objects and universal object identifiers, and mappings between management objects and universal object identifiers. At run time, the message translator 130 is capable of accessing the mappings to facilitate brokered communication between the plant floor side and the CM system side. Once all of the mappings are complete, then all vendor objects and types that have been mapped are in the same context which is defined by the universal standard (e.g., the MIMOSA standard). The MIMOSA open standard is extensible such that new rows may be added to the MIMOSA tables to support new vendor objects and types that may not conveniently map to a currently defined universal ID.

In accordance with various embodiments of the present invention, the defined objects may include, for example, assets, segments, agents, measurement points, enterprise, and site. An asset is a piece of physical equipment having a serial number. A segment is a logical view of the physical equipment, typically indicating a location of the physical equipment within an enterprise, an agent is a human agent or a software agent that makes an observation, typically providing human intelligence or artificial intelligence capability. Measurement points are outputs of sensors that measure various kinds of equipment parameters such as, for example, temperature and pressure. An enterprise refers to the corporate level of an organization. A site refers to a manufacturing plant, facility, or potentially a fleet object such as a truck which has its own set of segments and assets which may be tracked for maintenance purposes.

In accordance with various embodiments of the present invention, the defined types may include, for example, asset types, work types, priority types, asset priority types, alarm severity types, health types, work priority types, and problem code types. An asset type is a nominal scale type which is a hierarchical categorization of assets based on functional properties, for example "pump" or "seawater pump". A work type is a nominal scale type which is a categorization of maintenance activities, for example "preventive maintenance" or "corrective maintenance". An asset priority type is an ordinal scale type for ranking the relative importance of the asset. An alarm severity type is an ordinal scale type for ranking the relative importance of the severity of the alarm. A health type is a nominal scale type for indicating the type of health advisory, for example "vibration analysis" or "instrumentation alert". A work priority type is an ordinal scale type for ranking relative importance of work, for example "high" or "low". A problem code type is a nominal scale type which is a categorization of problems that can impact the health of assets, for example "mechanical failure" or "electrical failure".

Referring again to FIG. 1, the server platform 100 includes various software applications that reside in and run on the server platform 100 to provide various types of functionality. The various software applications shown in FIG. 1 may be discrete applications or may be combined in certain ways, in accordance with various embodiments of the present invention. In the discovery phase of set up, the server platform 100 detects plant floor monitoring systems and picks up device definitions within the plant floor monitoring systems. Similarly, the server platform 100 detects CM systems and picks up asset definitions within the CM systems. The server platform 100 includes a discovery application 140 adapted to automatically discover and import defined device objects and types from the plant floor data sources 210 via the plant floor driver/adapters 110, and adapted to automatically discover and import defined management objects and types from the CM system 230 via the CM system driver/adapter 120. The discovery application 140 is used during set up for configuring of the server platform 100 with particular plant floor data sources 210 and a particular CM system 230.

The server platform 100 also includes a semantic mapping or contextualizing application 150 adapted to semantically map the discovered management types to pre-defined open standard universal type identifiers, and adapted to semantically map certain device types to the pre-defined open standard universal type identifiers. When a device type gets mapped to a universal type ID, and a CM system type gets mapped to the same universal type ID, then the device type and the CM system type become related via the common universal type ID. Furthermore, certain device objects may get mapped to certain management types. When a device object gets mapped to a management type, the device type "inherits" all of the type information of the management type. Examples of such semantic mappings are described below herein with respect to FIGS. 5-8.

The server platform 100 further includes an assigning application 160 adapted to assign first universal object identifiers to the device objects and second universal object identifiers to the management objects. The server platform 100 also includes a non-semantic mapping application 170 adapted to non-semantically map the first universal object identifiers to the second universal object identifiers, thereby relating the device objects to the management objects.

The MIMOSA open standard defines the format of the universal IDs that are used for non-semantic assignments. Such non-semantic assignments may be used simply for trackability and traceability purposes.

The server platform 100 further includes a manual mapping application tool 175 allowing for a user to manually accomplish semantic and/or non-semantic mappings. Such manual mappings may be performed to refine automatic mappings performed by the server platform 100, or to accomplish mappings that are not automatically handled by the server platform 100.

In accordance with an embodiment of the present invention, the system 200 includes a graphic user interface 240 operationally interfacing to the server platform 100 and adapted to allow a user to manage, for example, MIMOSA-based mappings between defined device objects and types imported from the plant floor data sources 210 and the defined management objects and types imported from the CM system 230 using the manual mapping application tool 175. The graphic user interface 240 may be used for other purposes as well such as, for example, allowing a human operator to manually input information into the system 200.

Figure 3:
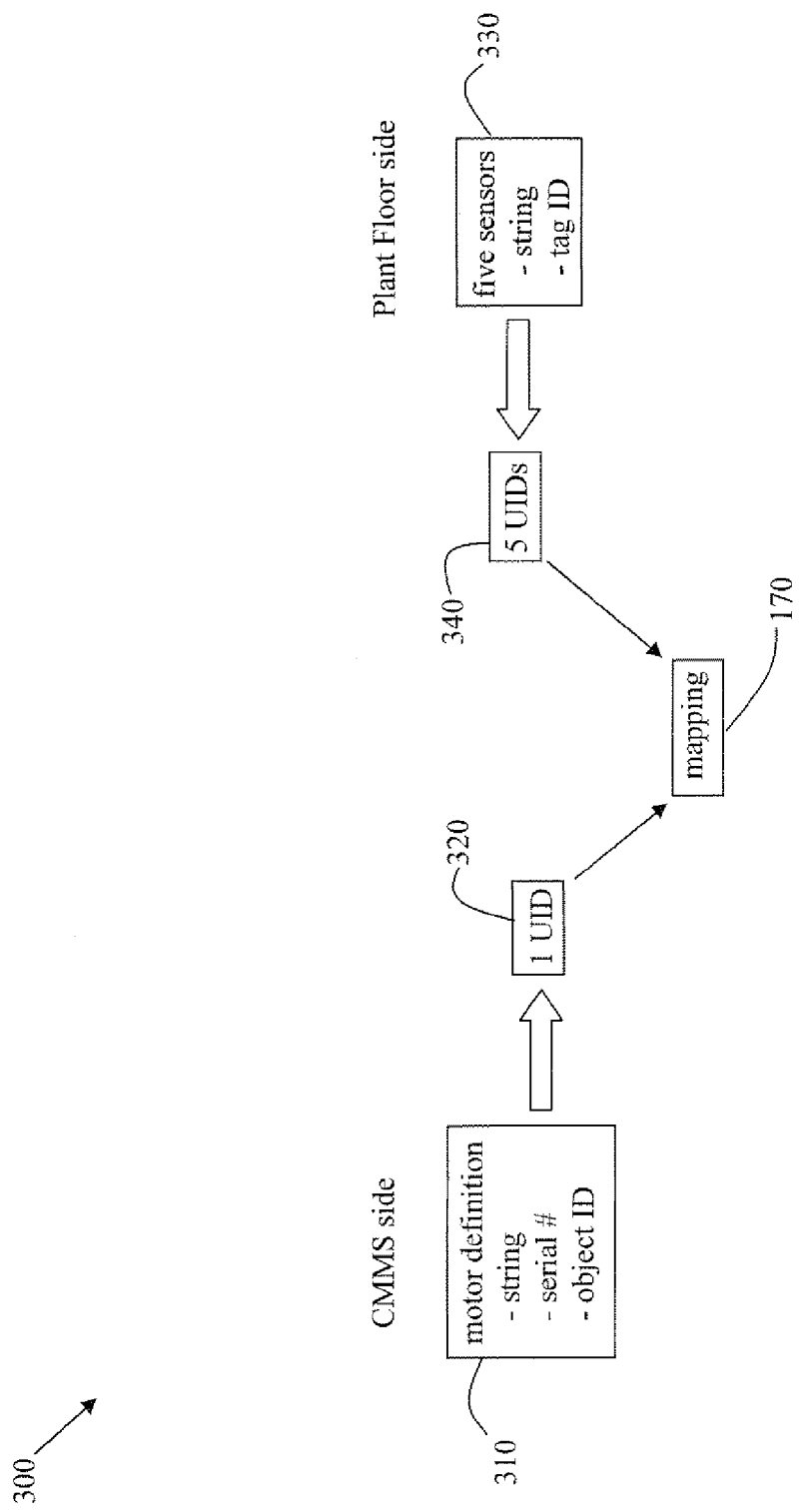
FIG. 3 is an exemplary diagram graphically illustrating a discrete mapping of device objects to CM objects.

For example, referring to FIG. 3, a CMMS system may provide a CMMS defined object 310 being a motor definition having a string, a serial number, and an object identifier in a proprietary format for the CMMS vendor. The CMMS object 310 may be assigned to a single universal object identifier 320 by the assigning application 160 of the server platform 100. Similarly, there may be five sensors on the plant side corresponding to five different device objects 330 each measuring a different parameter of the same actual motor on the plant floor. Each of the five device objects 330 may correspond to a different sensor measurement or reading for the motor. Each of the five device objects 330 may have a string and a tag identifier and get assigned to five different universal object identifiers 340 by the assigning application 160 of the server platform 100.

The non-semantic mapping application 170 may then automatically map the five universal object identifiers 340 corresponding to the five device objects 330 to the single universal object identifier 320 corresponding to the CMMS object 310, thereby relating the five sensors of the plant floor motor to the CMMS motor object and storing this mapping in the mapper database 132. Therefore, at run time (i.e., during operation of the system 200), rule-based work flows may be triggered and work orders may be generated for the motor in response to any of the five sensor measurements. As an alternative, the manual mapping application tool 175 may be used by an operator, via the graphic user interface 240, to manually perform the mapping. As a result there are five children UIDs mapped to one parent UID to establish the relationship between the CMMS motor definition and the five plant floor sensor outputs.

Non-semantic mappings may be many-to-one, as in the above example, or one-to-one. For example, for a compressor definition in the CM system, there could be a number of condition monitoring sensors which are fed into a plant historian. When the mappings are created, connections are defined between the plant floor tags (each of which correspond to a sensor in this example) and the asset definitions in the CM system. The server platform 100 may automatically discover and enumerate the entities from the plant floor systems, however, the mapping/association to the CM system via the universal open standard may require manual input.

The server platform 100 may further may include a condition-based maintenance application 180 adapted to generate maintenance work orders in response to information collected from the plant floor data sources 210 and the CM system 230. Certain kinds of maintenance work order include predictive maintenance work orders, preventive maintenance work orders, corrective maintenance work orders, and emergency maintenance work orders. For example, the condition-based maintenance application 180 may monitor a lower level condition point of a plant floor valve providing temperature and vibration information. If the temperature exceeds 100° C. and the vibration level exceeds a threshold value $T_{VIB}$ and the valve status is "open", then a work order may be generated to, for example, shut down the valve and/or have the valve inspected.

As an option, the server platform 100 may also include a performance measurement application 190 adapted to track key performance indicators in response to information collected from the plant floor data sources 210 and the CM system 230. The performance measurement application 190 tracks key performance indicators in the form of score cards, in accordance with an embodiment of the present invention. Such applications 180 and 190 process and analyze data put information in a human intelligible form.

For example, a key performance indicator (KPI) may be the overall facility maintenance cost as a percentage of the overall facility equipment replacement cost. If the cost to maintain the facility equipment is greater than the cost to replace the facility equipment, then it is likely that too much maintenance is being performed at the facility. Such a key performance indicator is determined by the performance measurement application 190 after extracting and relating the relevant information from the CM system side and the plant floor side. A lower level KPI may be pulled up into a higher level KPI, for example, such that the higher level KPI may be used by an executive at headquarters.

As an option, the server platform 100 may include a software development kit (SDK) 195 which is an API programming tool kit that allows vendors to communicate messages to call an appropriate method and direct the SDK 195 to perform an appropriate mapping. Such an SDK 195 allows a vendor to have more direct control over the mapping outcomes.

Figure 4:
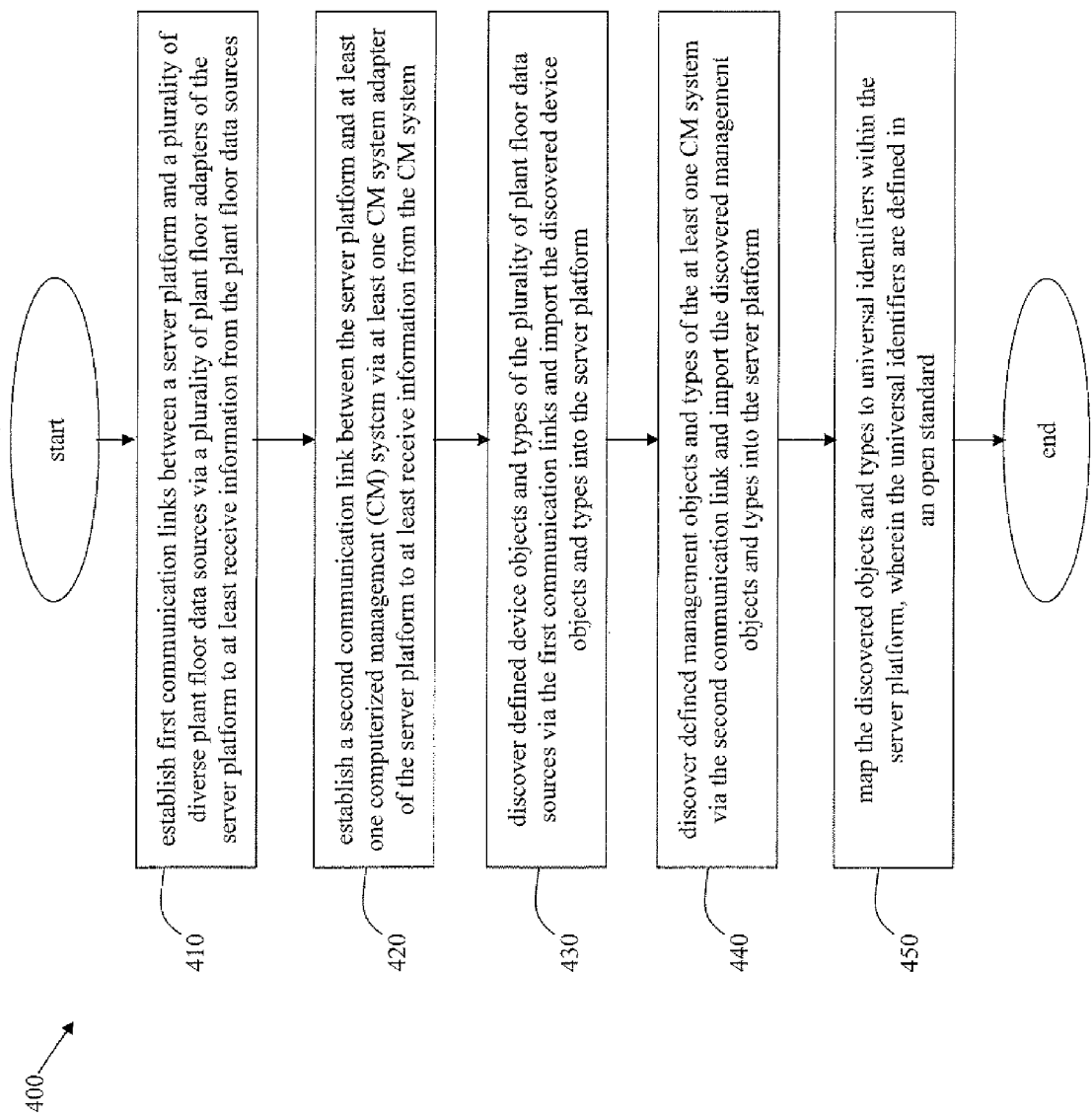
FIG. 4 illustrates a flowchart of an embodiment of a method of integrating a plurality of diverse plant floor equipment with at least one computerized management (CM) system using the server platform of FIG. 1.

FIG. 4 illustrates a flowchart of an embodiment of a method 400 of integrating a plurality of diverse plant floor equipment 220 with at least one computerized management (CM) system 230 using the server platform 100 of FIG. 1. In step 410, establish first communication links 215 between the server platform 100 and a plurality of diverse plant floor data sources 210 via a plurality of plant floor adapters 110 of the server platform 100 to at least receive information from the plant floor data sources 210. In step 420, establish a second communication link 235 between the server platform 100 and at least one computerized management (CM) system 230 via at least one CM system adapter 120 of the server platform 100 to at least receive information form the CM system 230. In step 430, discover defined device objects and types of the plurality of plant floor data sources 210 via the first communication links 215 and import the discovered device objects and types into the server platform 100. In step 440, discover defined management objects and types of the at least one CM system 230 via the second communication link 235 and import the discovered management objects and types into the server platform 100. In step 450, map the discovered objects and types to universal identifiers within the server platform 100, wherein the universal identifiers are defined in an open standard. In accordance with an embodiment of the present invention, the open standard is the MIMOSA open standard. The method 400 is accomplished during a set up time or a configuration time for the server platform 100.

The mapping of step 450 may include semantically contextualizing the device types and the management types to pre-defined open standard universal type identifiers within the server platform 100. Also, the mapping of step 450 may include assigning the device objects and the management objects to globally unique identifiers (universal object identifiers) within the server platform 100. Furthermore, the mapping of step 450 may include semantically associating the management objects to universal type identifiers within the server platform 100. The mapped universal identifiers are stored within the mapper database 132 of the server platform 100.

Again, the CM system 230 may include an enterprise asset management (EAM) system, a computerized maintenance management system (CMMS), or some other type of computerized management system. The first communication links 215 are adapted to use at least one of open communication protocols and proprietary communication protocols such as an open connectivity protocol, a modbus protocol, an XML web services protocol, or some particular proprietary protocol, for example. The second communication link 235 is adapted to use a web services protocol such as, for example, the MIMOSA OSA-EAI Tech-XML-services web services protocol.

In accordance with an embodiment of the present invention, the device types may include at least one of alarm severity types, asset criticality types, health types, problem types, failure types, and remedy types. Similarly, the management types may include at least one of asset types, work priority types, asset criticality types, health types, problem types, failure types, and remedy types.

Once the server platform 100 is configured using the method 400 of FIG. 4, the entire system 200 may be run such that the server platform 100 brokers communication between the plant floor data sources 210 and the CM system 230 using the stored mapped universal identifiers. The server platform 100 may poll certain measurement points every so often and pull the data into the server platform via the drivers/adapters. Also, there may be one or more dedicated real-time connections to the server platform 100 such that the server platform 100 is continuously pulling in real-time data. Furthermore, an asset health vendor may use the SDK 195 to push messages into the server platform 100 by writing code against the API of the SDK.

One or more work flows may be triggered in response to the brokered communication during run time of the system 200. In general, a particular work flow is triggered when a certain set of conditions occur. For example, the various kinds of work flows that may be triggered include an audit work status work flow, an escalate priority work flow, a synchronize asset data work flow, a production asset capability forecast work flow, and a measure performance work flow (score carding). A work flow is similar to a state machine operation and includes a set of steps that occur over time and often involve human interaction. At run time, a work flow routes messages to the appropriate system end points.

For example, an alert or alarm may be detected for a piece of equipment on the plant floor that has a problem and requires attention. In response to the detected alert, a work flow is triggered and a work order is generated, having a first priority, in the CM system to go and inspect that piece of equipment (i.e., that asset). If two weeks pass, and there is no record in the CM system that the inspection has occurred, then the priority may be escalated by opening the work order and increasing the priority of the work order and triggering a work flow in the CM system which will flag the situation to the maintenance committee to make sure action is taken immediately. Similarly, if a more critical alert occurs, the priority of the work order may be escalated. However, to escalate priority, the system 200 must understand the semantic meaning within the CM system for the corresponding priority code. The semantic mappings provide this meaning and allows rules for escalating priority and for checking work order status to be processed.

As another example of a work flow, with respect to synchronization of data, a valve may be installed on the plant floor and the valve is detected by one of the lower level plant device monitoring systems (i.e., a plant floor data source) such as a device manager. When the server platform 100 determines that the valve has been installed on the plant floor, the server platform 100 may check within the CM system to determine if such a valve has already been defined. If not, the corresponding valve definition can be automatically generated and mapped (semantically and/or non-semantically).

As a further example, an asset health system (a particular kind of plant floor data source) may detect a degradation in the health of a certain piece of plant floor equipment. The asset health system may push a message "create work order" to the server platform 100. As a result, a work flow is triggered within the server platform 100 in response to the message. The server platform 100 checks if there is already a work order open and, if so, if the status of the work order is "opened" or "closed". If the status of the work order is "closed", another work order may be generated. If the status of the work order is "open", the priority of the work order may be escalated.

Figure 5:
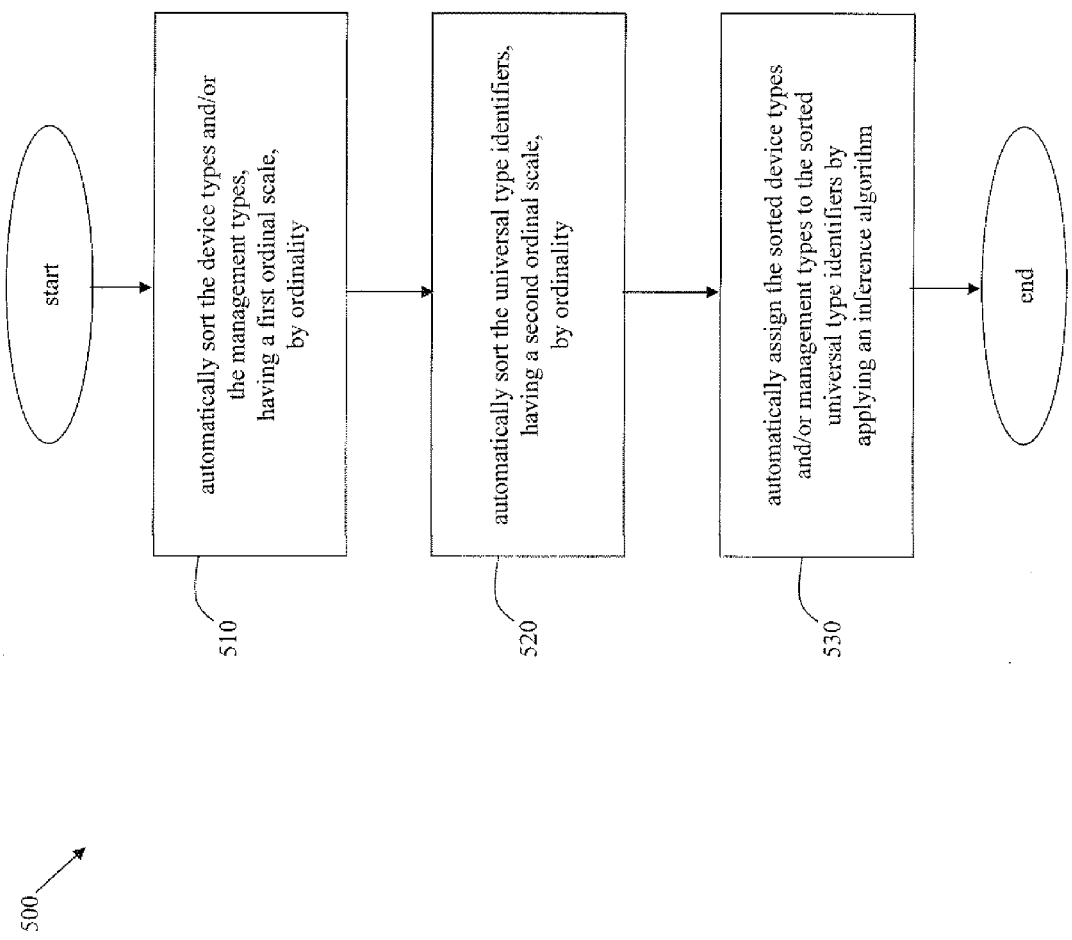
FIG. 5 illustrates a flowchart of a first embodiment of a method of semantically contextualizing vendor types to universal type identifiers.

FIG. 5 illustrates a flowchart of a first embodiment of a method 500 of semantically contextualizing vendor types to universal type identifiers. In step 510, automatically sort the device types and/or the management types, having a first ordinal scale, by ordinality. In step 520, automatically sort the universal type identifiers, having a second ordinal scale, by ordinality. In step 530, automatically assign the sorted device types and/or management types to the sorted universal type identifiers by applying an inference algorithm.

Figure 6:
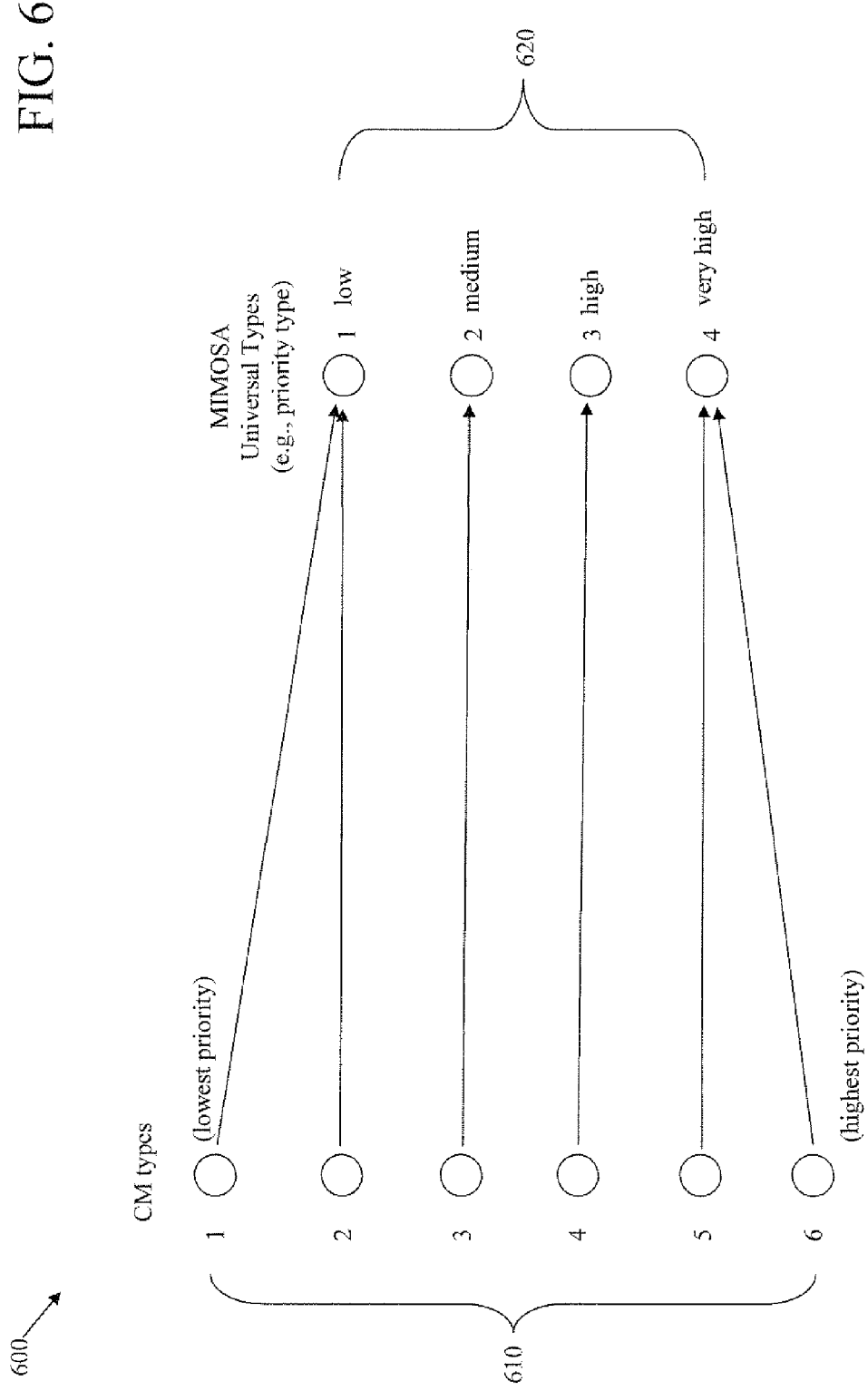
FIG. 6 is an exemplary diagram graphically illustrating the method of FIG. 5.

FIG. 6 is an exemplary diagram 600 graphically illustrating the method 500 of FIG. 5. The diagram 600 illustrates how CM types 610, being priority types and having an ordinal scale of 1 to 6, have been sorted by ordinal number from lowest priority 1 to highest priority 6. The CM types 610 may correspond to the priority of a corrective maintenance work order, for example. The diagram 600 also illustrates how MIMOSA universal types 620, also being priority types and having a different ordinal scale of 1 to 4 (low, medium, high, very high), have been sorted by ordinal number from lowest priority 1 to highest priority 4. An automated inference algorithm is used to perform the semantic contextualization mapping from the CM types 610 to the MIMOSA universal types 620 as shown by the arrows.

In this example, the automated inference algorithm applies a histogram technique that allows mapping from one ordinal scale to another. The histogram technique results in CM types 1 and 2 being mapped to MIMOSA universal type 1 (low priority), CM type 3 being mapped to MIMOSA universal type 2 (medium priority), CM type 4 being mapped to MIMOSA universal type 3 (high priority), and CM types 5 and 6 being mapped to MIMOSA universal type 4 (very high priority). Therefore, the six priority types on the CM side have been successfully mapped (in a semantically contextualized manner) to the four priority types defined by the MIMOSA open standard. In accordance with an embodiment of the present invention, the sorting and mapping is performed by the semantic mapping application 150 of the server platform 100.

Figure 7:
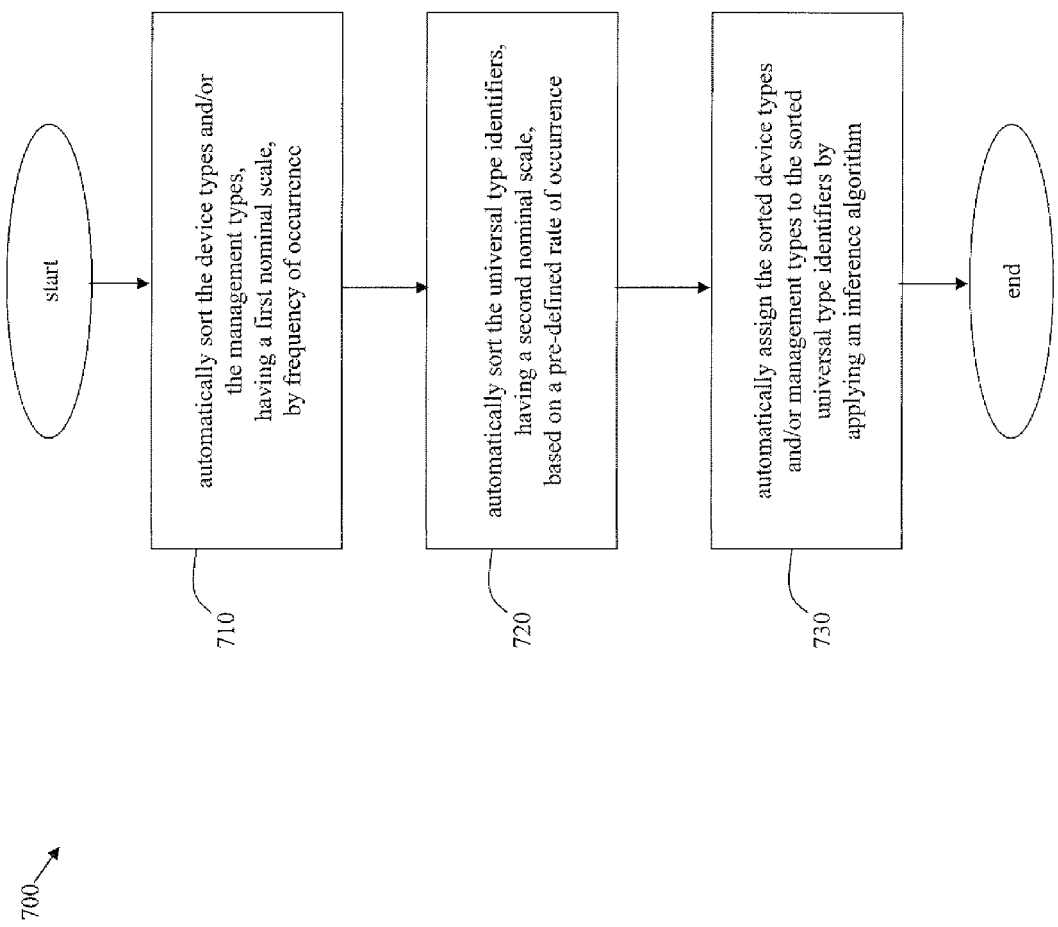
FIG. 7 illustrates a flowchart of a second embodiment of a method of semantically contextualizing vendor types to universal type identifiers.

FIG. 7 illustrates a flowchart of a second embodiment of a method 700 of semantically contextualizing vendor types to universal type identifiers. In step 710, automatically sort the device types and/or the management types, having a first nominal scale, by frequency of occurrence. In step 720, automatically sort the universal type identifiers, having a second nominal scale, based on a pre-defined rate of occurrence. In step 730, automatically assign the sorted device types and/or management types to the sorted universal type identifiers by applying an inference algorithm.

Figure 8:
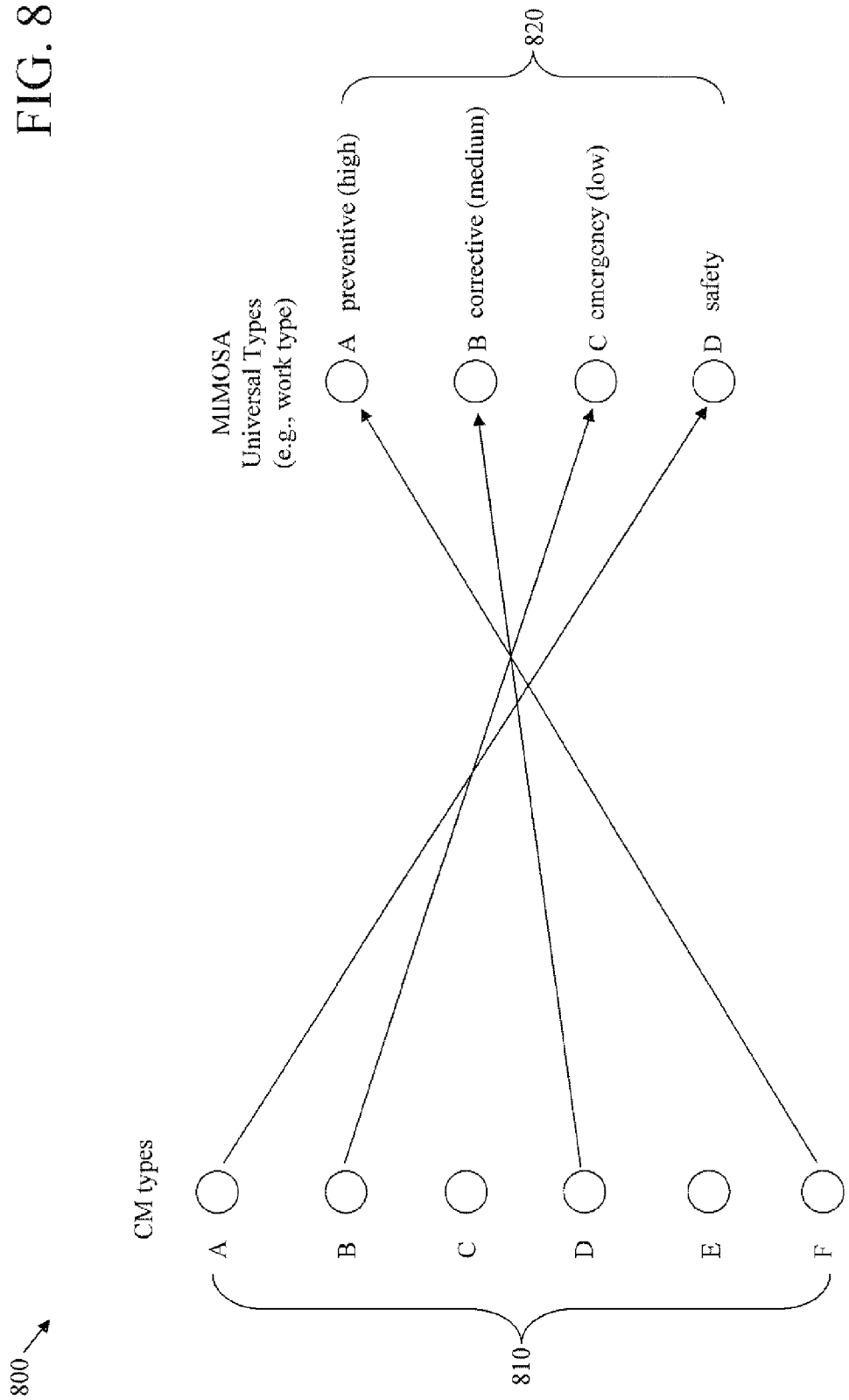
FIG. 8 is an exemplary diagram graphically illustrating the method of FIG. 7.

FIG. 8 is an exemplary diagram 800 graphically illustrating the method 700 of FIG. 7. The diagram 800 illustrates how CM types 810, being work types and having a nominal scale of A to F, have been sorted by frequency of occurrence from highest (A) to lowest (F). The CM types 810 may correspond to the different maintenance work types, for example. The diagram 800 also illustrates how MIMOSA universal types 820, also being work types and having a different nominal scale of A to D (preventive-high, corrective-medium, emergency-low, and safety), have been sorted based on a pre-defined rate of occurrence. The pre-defined rate of occurrence may be determined from an actual work order history that has been accumulated and stored in the server platform 100 or in the CM system 230. An automated inference algorithm is used to perform the semantic contextualization mapping from the CM types 810 to the MIMOSA universal types 820 as shown by the arrows.

In this example, the automated inference algorithm applies a heuristic probability technique that allows mapping from one nominal scale to another. The heuristic probability technique results in CM type A being mapped to MIMOSA universal type D (safety), CM type B being mapped to MIMOSA universal type C (emergency-low), CM type D being mapped to MIMOSA universal type B (corrective-medium), and CM type F being mapped to MIMOSA universal type A (preventive-high). Therefore, four of the six work types on the CM side have been successfully mapped (in a semantically contextualized manner) to the four work types defined by the MIMOSA open standard. Two of the CM types C and E apparently do not semantically fit into any of the four MIMOSA universal types A to D and, therefore, have not been mapped. Such CM work types C and E may not be used by the server platform 100 in the system 200, or may be handled in a separate manner by the server platform 100. Again, in accordance with an embodiment of the present invention, the sorting and mapping is performed by the semantic mapping application 150 of the server platform 100.

Figure 9:
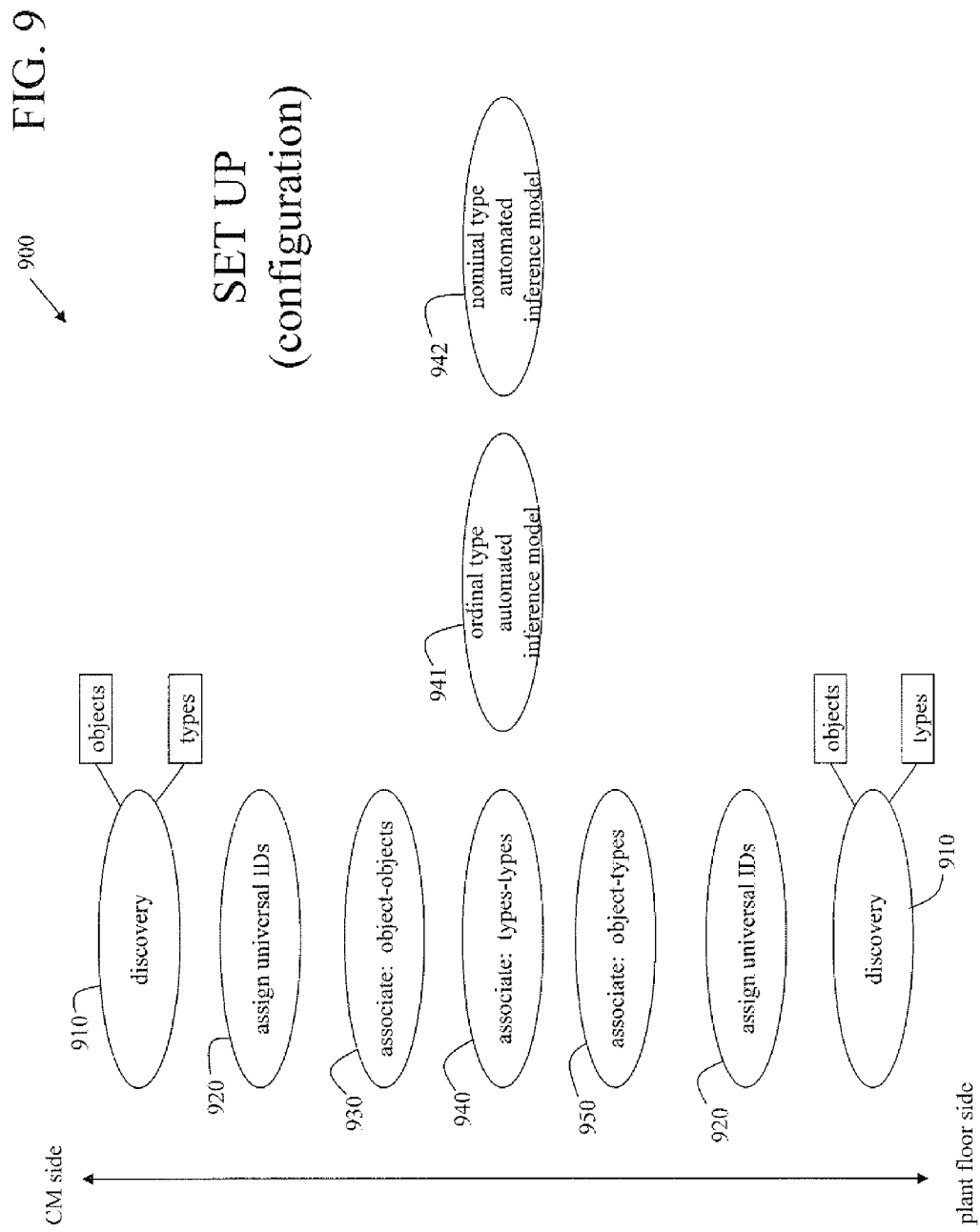
FIG. 9 is an exemplary diagram graphically illustrating a process for setting up (i.e., configuring) the server platform of FIG. 1 within the system of FIG. 2.

FIG. 9 is an exemplary diagram 900 graphically illustrating the process for setting up (i.e., configuring) the server platform 100 of FIG. 1 within the system 200 of FIG. 2. Discovery 910 of objects and types is performed both on the CM side and the plant floor side. Assigning 920 of universal identifiers is performed, both on the CM side and the plant floor side, to objects and types. Non-semantic association 930 of CM objects and device objects is performed. Contextualized semantic type association 940 of CM types and device types is performed. The semantic type associations may be performed using an ordinal type automated inference model 941, a nominal type automated inference model 942, or some other interference model (not shown). Furthermore, contextualized semantic type association 950 of objects and types is performed.

Figure 10:
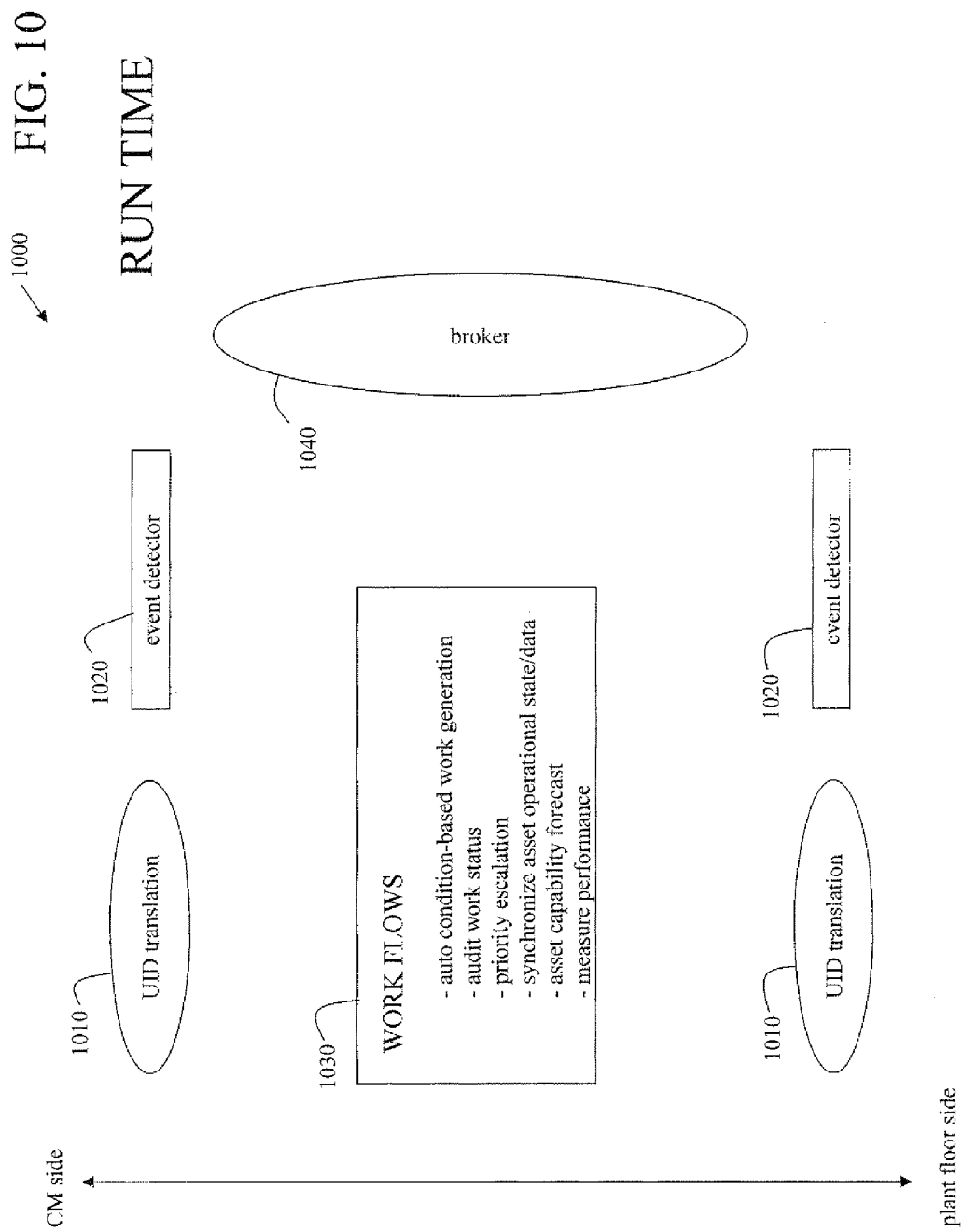
FIG. 10 is a diagram graphically illustrating a process for actively running the system of FIG. 2 using the server platform of FIG. 1.

FIG. 10 is a diagram 1000 graphically illustrating the process for actively running the system 200 of FIG. 2 using the server platform 100 of FIG. 1. As data and information are received by the server platform 100 from both the plant floor side and the CM side, the server platform 100 performs universal identifier (UID) translations 1010 based on the mappings that were generated during set up and stored in the mapper database 132. Events are detected 1020 within the server platform 100 in response to the translated data and information, and work flows 1030 are triggered in response to the detected events 1020. Also, the server platform 100 brokers communications 1040 between the CM side and the plant floor side to accomplish work flows and to generate work orders.

In accordance with an embodiment of the present invention, the server platform 100 may extract information from the CM system 230 and send the extracted information to the plant floor side to be rendered or displayed via a portal on the plant floor side. For example, work history status or priority information may be extracted and rendered in this manner. In general, the CM system 230 may transmit back events that occur to the plant floor for non-control purposes. Such events include change events such as, for example, a change in a work status. For example, a planned overhaul message may be sent from the CM system to an asset health system on the plant floor. As a result, the asset health system will know not to send out a plurality of predictive work orders, for example, because the associated plant floor equipment will be getting shut down to perform the planned overhaul.

In summary, a server platform and a method to integrate a plurality of diverse plant floor equipment with at least one computerized management system in a manufacturing operational or maintenance system are disclosed. The server platform, using an open standard, enables a universal enterprise type taxonomy across the plant floor data sources and the at least one computerized management system, providing a manufacturing intelligence solution that contextualizes the disparate data in a balanced manner.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments failing within the scope of the appended claims.

What is claimed is:

1. A server platform for integrating a plurality of diverse plant floor equipment with at least one computerized management (CM) system, said server platform comprising:
    a processor;
    a memory;
    a plurality of plant floor drivers adapted to interface with a plurality of diverse plant floor data sources to at least receive first information from said plant floor data sources, at least one of the plurality of diverse plant floor data sources providing a measurement associated with a first plant equipment;
    at least one CM system driver adapted to interface with said at least one CM system to at least receive second information from said at least one CM system;
    a discovery application adapted to:
    automatically discover and import defined device objects and types from said plurality of diverse plant floor data sources via said plant floor drivers, said defined device objects including a first device object representing said first plant equipment and a second device object representing at least one of the plurality of diverse plant floor data sources, and
    automatically discover and import defined management objects and types from said at least one CM system via said CM system driver;
    one or more mapping applications configured to map said defined device objects and types and said defined management objects and types to universal identifiers to generate mappings, the one or more mapping applications being configured to map said first device object, said second device object and a first management object of said defined management objects to a first universal identifier, thereby relating the first plant equipment and the at least one of the plurality of diverse plant floor data sources to the first management object; and
    a message translator adapted to, based on said mappings, associate portions of the first information from said plant floor data sources with portions of the second information from said at least one CM system.

2. The server platform of claim 1 wherein said message translator includes a semantic model forming an open object metadata registry capable of enabling a universal enterprise type taxonomy across said plant floor data sources and said at least one CM system.

3. The server platform of claim 1 further comprising a mapper database adapted to store semantic mappings and non-semantic mappings between said plant floor data sources and said CM system such that said message translator is capable of accessing said mappings to facilitate said message translator to associate said portions of first and second information.

4. The server platform of claim 1 wherein said CM system comprises one of a computerized maintenance management system (CMMS) and an enterprise asset management (EAM) system.

5. The server platform of claim 1 wherein said plant floor data sources includes at least one of an asset health system, condition monitoring sensors, and a plant historian system.

6. The server platform of claim 1 wherein said universal identifiers are defined in an open standard and said open standard comprises the MIMOSA open standard.

7. The server platform of claim 1 further comprising a contextualizing application adapted to semantically map said management types to pre-defined open standard universal type identifiers and adapted to semantically map said device types to said pre-defined open standard universal type identifiers.

8. The server platform of claim 1 further comprising an assigning application adapted to assign first universal object identifiers to said device objects and second universal object identifiers to said management objects.

9. The server platform of claim 8 wherein a first mapping application of the one or more mapping applications is adapted to non-semantically map said first universal object identifiers to said second universal object identifiers, thereby relating said device objects to said management objects.

10. The server platform of claim 1 wherein said defined objects comprise at least one of assets, segments, agents, measurement points, enterprise, and site.

11. The server platform of claim 1 wherein said defined types comprise at least one of asset types, work types, priority types, asset priority types, alarm severity types, ordinal health types, work priority types, and problem code types.

12. The server platform of claim 1 further comprising a condition based maintenance application adapted to generate maintenance work orders in response to said first information collected from said plant floor data sources and said second information collected from said at least one CM system.

13. The server platform of claim 1 further comprising a performance measurement application adapted to track key performance indicators in response to said first information collected from said plant floor data sources and said second information collected from said at least one CM system.

14. The server platform of claim 1 wherein communication with said plurality of plant floor data sources is accomplished via at least one of open communication protocols and proprietary communication protocols.

15. The server platform of claim 1 wherein communication with said at least one CM system is accomplished via a web services protocol.

16. A method of integrating a plurality of diverse plant floor equipment with at least one computerized management (CM) system, said method comprising:
    establishing first communication links between a server platform and a plurality of diverse plant floor data sources via a plurality of plant floor adapters of said server platform to at least receive first information from said plant floor data sources, at least one of the plurality of diverse plant floor data sources providing a measurement associated with a first slant equipment;
    establishing a second communication link between said server platform and at least one computerized management (CM) system via at least one CM system adapter of said server platform to at least receive second information from said CM system;
    discovering defined device objects and types of said plurality of plant floor data sources via said first communication links and importing said defined device objects and types into said server platform, said defined device objects including a first device object representing said first plant equipment and a second device object representing said at least one of the plurality of diverse plant floor data sources;

discovering defined management objects and types of said at least one CM system via said second communication link and importing said defined management objects and types into said server platform; and mapping said defined device objects and types and said defined management objects and types to universal identifiers to generate mappings within said server platform, wherein said first device object, said second device object and a first management object of said defined management objects are mapped to a first universal identifier, thereby relating the first plant equipment and the at least one data source to the first management object.

17. The method of claim 16 wherein said mapping includes semantically contextualizing said device types and said management types to pre-defined open standard universal type identifiers within said server platform.

18. The method of claim 16 wherein said mapping includes assigning said device objects and said management objects to globally unique identifiers within said server platform.

19. The method of claim 16 wherein said mapping includes semantically associating said management objects to universal type identifiers within said server platform.

20. The method of claim 16 wherein said CM system comprises one of a computerized maintenance management system (CMMS) and an enterprise asset management (EAM) system.

21. The method of claim 16 wherein said first communication links are adapted to use at least one of open communication protocols and proprietary communication protocols.

22. The method of claim 21 wherein said protocols include at least one of an open connectivity protocol, a modbus protocol, an XML web services protocol, and a proprietary protocol.

23. The method of claim 16 wherein said second communication link is adapted to use a web services protocol.

24. The method of claim 23 wherein said web services protocol includes a MTM:OSA OSA-EAI Tech-XML-services web services protocol.

25. The method of claim 16 wherein said defined objects include at least one of assets, segments, agents, measurement points, enterprise, site.

26. The method of claim 16 wherein said defined types include at least one of asset types, work types, priority types, asset priority types, alarm severity types, ordinal health types, work priority types, and problem code types.

27. The method of claim 16 wherein said device types include at least one of alarm severity types, asset criticality types, health types, problem types, failure types, and remedy types.

28. The method of claim 16 wherein said management types includes at least one of asset types, work priority types, asset criticality types, health types, problem types, failure types, and remedy types.

29. The method of claim 16 further comprising storing said mapped universal identifiers within said server platform.

30. The method of claim 29 further comprising associating portions of the first information from said plant floor data sources with portions of the second information from said at least one CM system using said stored mapped universal identifiers.

31. The method of claim 16 wherein said universal identifiers are defined in an open standard and said open standard comprises the MIMOSA open standard.

32. The method of claim 30 further comprising automatically triggering at least one work flow in response to said associated portions.

33. The method of claim 32 wherein said work flow comprises at least one of an audit work status work flow, an escalate priority work flow, a synchronize asset data work flow, a production asset capability forecast work flow, and a measure performance work flow.

34. The method of claim 30 further comprising automatically generating at least one work order in response to said associated portions.

35. The method of claim 34 wherein said work order comprises an automated condition-based maintenance work order.

36. The method of claim 35 wherein said automated condition-based maintenance work order comprises at least one of a predictive maintenance work order, a corrective maintenance work order, a preventive maintenance work order, and an emergency maintenance work order.

37. The method of claim 30 further comprising automatically tracking at least one key performance indicator in response to said associated portions.

38. The method of claim 17 wherein said semantic contextualizing includes:
   automatically sorting said device types and/or said management types, having a first ordinal scale, by ordinality;
   automatically sorting said universal type identifiers, having a second ordinal scale, by ordinality; and
   automatically assigning said sorted device types and/or management types to said sorted universal type identifiers by applying an inference algorithm.

39. The method of claim 38 wherein said inference algorithm includes a histogram technique.

40. The method of claim 17 wherein said semantic contextualizing includes:
   automatically sorting said device types and/or said management types, having a first nominal scale, by frequency of occurrence;
   automatically sorting said universal type identifiers, having a second nominal scale, based on a pre-defined rate of occurrence; and
   automatically assigning said sorted device types and/or management types to said sorted universal type identifiers by applying an inference algorithm.

41. The method of claim 40 wherein said inference algorithm includes a heuristic technique.

42. The method of claim 40 wherein said frequency of occurrence is determined from a work history stored within said server platform.

43. A system for maintenance and asset management, said system comprising:
   a plurality of plant floor data sources adapted to collect first data from a plurality of plant floor equipment, at least one of the plurality of plant floor data sources providing a measurement associated with a first plant floor equipment;
   at least one computerized management (CM) system adapted to provide second data; and
   a server platform adapted to integrate said plurality of plant floor data sources with said at least one CM system based on a universal enterprise type taxonomy, said server platform comprising:
   a processor;
   a memory;
   a plurality of plant floor drivers adapted to receive at least a portion of the first data, at least one CM system driver adapted to receive at least a portion of the second data, a discovery application adapted to:

automatically discover and import defined device objects and types from said plant floor data sources via said plant floor drivers, said defined device objects including a first device object representing said first plant equipment and a second device object representing said at least one of the plurality of plant floor data sources, and automatically discover and import defined management objects and types from said at least one CM system via said CM System driver; and one or more mapping applications configured to map said defined device objects and types and said defined management objects and types to universal identifiers of the universal enterprise taxonomy to generate mappings, the one or more mapping applications being configured to map said first device object, said second device object and a first management object of said defined management objects to a first universal identifier, thereby relating the first plant equipment and the at least one data source with the first management object.

44. The system of claim 43 wherein said universal enterprise type taxonomy is defined in an open standard and the open standard comprises the MIMOSA open standard.

45. The system of claim 43 wherein said computerized management (CM) system comprises one of a computerized maintenance management system (CMMS) and an enterprise asset management (EAM) system.

46. The system of claim 43 wherein said server platform further comprises:

a message translator adapted to, based on said mappings, associate portions of the first data from said plant floor data sources with portions of said second data from said at least one CM system.

47. The system of claim 46 wherein said message translator includes a semantic model forming an open object metadata registry capable of enabling said universal enterprise type taxonomy across said plant floor data sources and said at least one CM system.

48. The system of claim 43 further comprising a contextualizing application residing in said server platform and adapted to semantically map said management types to pre-defined open standard universal type identifiers and adapted to semantically map said device types to said pre-defined open standard universal type identifiers.

49. The system of claim 43 further comprising an assigning application residing in said server platform and adapted to assign first universal object identifiers to said device objects and second universal object identifiers to said management objects.

50. The system of claim 49 wherein a first mapping application of the one or more mapping applications is adapted to non-semantically map said first universal object identifiers to said second universal object identifiers, thereby relating said device objects to said management objects.

51. The system of claim 43 wherein said defined objects comprise at least one of assets, segments, agents, measurement points, enterprise, and site.

52. The system of claim 43 wherein said defined types include at least one of asset types, work types, priority types, asset priority types, alarm severiiy types, ordinal health types, work priority types, and problem code types.

53. The system of claim 43 further comprising a condition based maintenance application residing in said server platform and adapted to generate maintenance work orders in response to information collected from said plant floor data sources and said at least one CM system.

54. The system of claim 43 further comprising a performance measurement application residing in said server platform and adapted to track key performance indicators in response to information collected from said plant floor data sources and said at least one CM system.

55. The system of claim 43 wherein communication between said plurality of plant floor data sources and said server platform is accomplished via at least one of open communication protocols and proprietary communication protocols.

56. The system of claim 43 wherein communication between said at least one CM system and said server platform is accomplished via a web services protocol.

57. The system of claim 43 further comprising a graphic user interface operationally interfacing to said server platform and adapted to allow a user to at least manage MIMOSA-based mappings between defined device objects and types imported from said plant floor data sources and said defined management objects and types imported from said at least one CM system.

* * * * *